UNITED STATES PATENT OFFICE.

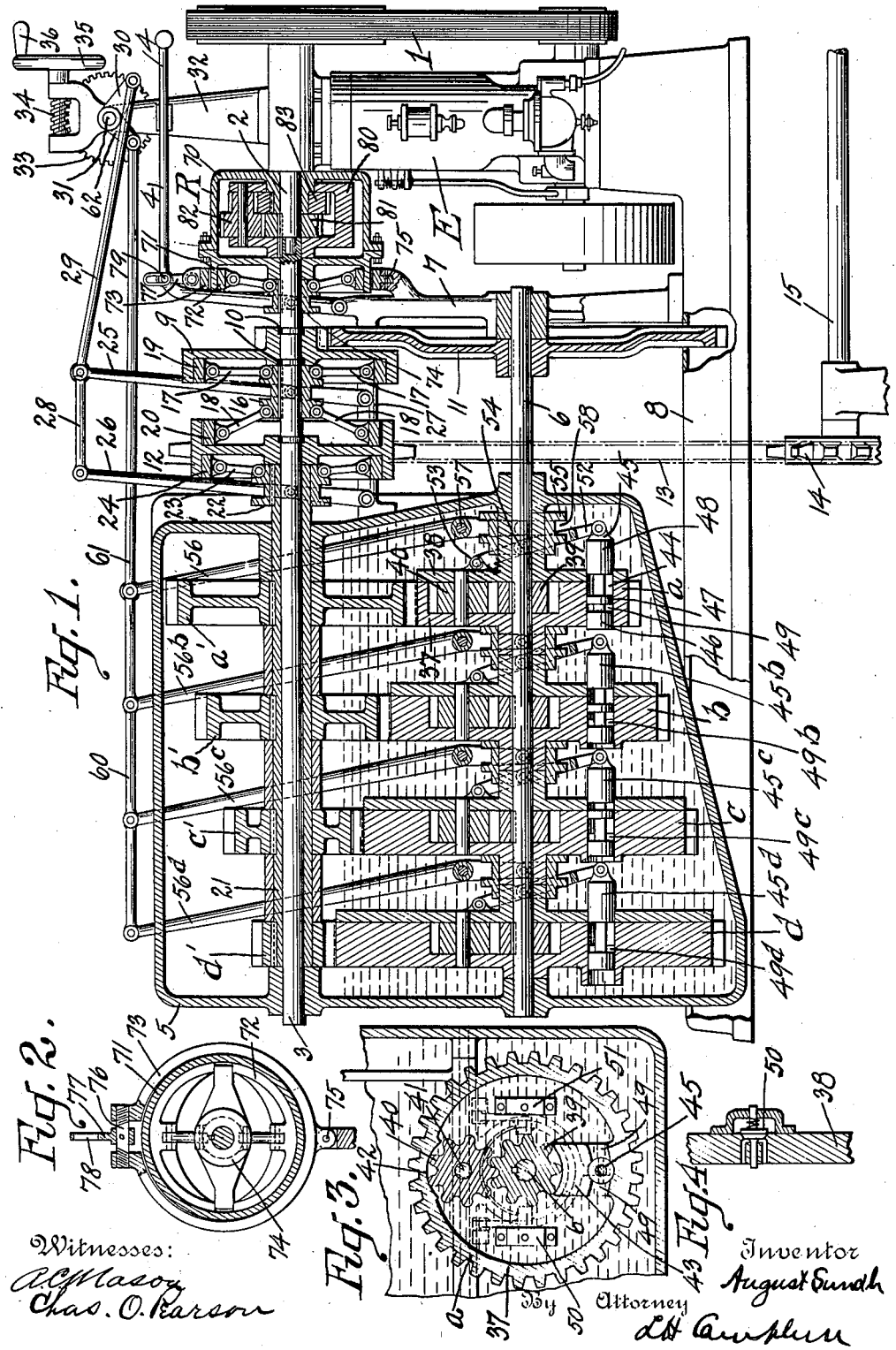

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

VARIABLE-SPEED GEARING.

1,095,479.  Specification of Letters Patent.  Patented May 5, 1914.

Application filed June 28, 1909. Serial No. 504,634.

*To all whom it may concern:*

Be it known that I, AUGUST SUNDH, a citizen of the United States, residing in Yonkers, in the county of Westchester and State of New York, have invented a new and useful Improvement in Variable-Speed Gearing, of which the following is a specification.

My invention relates to power transmission mechanism, and comprises a series of gears through which power may be transmitted from a prime mover to a driven member, and means for controlling the operation of said gears by a liquid which forms part of the power transmitting means.

The invention further comprises clutch mechanism coöperating with said gears, and means for controlling said clutch mechanism and gears to effect the operation of the driven member in either direction and at any desired speed.

In the usual form of power transmitting mechanism as applied to automobiles and other machinery, the speed changing gearing has to be handled with care in order to avoid injury to the mechanism, and this gearing is often hard to operate when working under a load, so that in many cases the speed of the prime mover has to be reduced or clutches disconnected before the gearing can be operated to change the speed.

One of the objects of the present invention is to overcome these difficulties by employing a series of gears in which a liquid is used as a means for connecting or disconnecting the gears from a driving member, and providing in combination therewith controlling means operable to gradually vary the connections with ease and without placing any sudden or undue strain upon the mechanism even when the speed is rapidly changed and regardless of the load conditions.

Other objects of the invention will appear hereinafter, the scope of the invention being defined in the appended claims, in which are set forth the novel combinations of elements.

Referring to the accompanying drawings, Figure 1 is a part sectional elevation of mechanism embodying the present invention; Fig. 2 is a sectional view of the reversing clutch; Fig. 3 is a sectional elevation of one of the gears; Fig. 4 is a detail view of one of the valves used in connection with the gears.

A prime mover which may be any suitable form of motor, and which is here shown as a gas engine E is connected as by means of a belt 1 to drive a shaft 2. The engine E may operate continuously in one direction, and is connected through a reversing clutch R to a shaft 3, which is adapted to rotate in either direction depending upon the position of the reversing clutch lever 4. The shaft 3 extends through a casing 5 in which are mounted a series of transmission gears, that will be fully described later, the outer end of the shaft 3 being journaled in said casing. A second shaft 6 parallel with the shaft 3, extends through the lower portion of the casing and is journaled therein. The right hand end of the shaft 6 is journaled in a standard 7 mounted on the bed plate 8 on which the gas engine E is also mounted. A gear wheel 9 is mounted on the shaft 3 and is free to rotate independently of the shaft but is prevented from moving longitudinally of the shaft by means of rings 10. This gear wheel 9 is in mesh with a gear wheel 11 keyed to the shaft 6. A sprocket gear wheel 12 is also mounted to rotate independently of the shaft 3, and is connected by means of a sprocket chain 13 with the sprocket wheel 14 secured to the driven shaft 15. The gear wheels 9 and 12 form members of clutch mechanism as will presently appear. Between these gear wheels is a sleeve 16 splined on the shaft 3, so as to be movable longitudinally thereof, and connected by links 17 and 18 to the inner clutch members 19 and 20, coöperating with the clutch members 9 and 12 respectively. A hollow shaft or sleeve 21 is mounted on the shaft 3 and is adapted to rotate independently of the shaft 3. Keyed to the hollow shaft 21 and located within the casing 5 is a series of stepped gear wheels $a'$, $b'$, $c'$ and $d'$, which mesh respectively with gear wheels $a$, $b$, $c$ and $d$, mounted on the shaft 6. A sleeve 22 is splined on the hollow shaft 21 and is connected by radial arms 23 with a clutch member 24 coöperating with the clutch member 12. Clutch operating levers 25 and 26 are pivoted at their lower ends to an arm 27 formed on the standard 7 and extending across to the casing 5. These levers 25 and 26 are provided with lugs or antifriction rollers engaging annular recesses formed in the sleeves 16 and 22, respectively; so that a movement of the levers about their pivots will move the sleeves longitudinally. The upper ends of the levers 25 and 26 are connected by a link 28. A rod 29 is pivoted at one end to the lever 25 and at its opposite end to a crank arm 30 secured to a shaft 31 journaled in the upper end of a standard 32. A worm wheel 33 secured to the shaft 31 is in mesh with the worm on the worm shaft 34 journaled in the upper end of the bracket 32. A hand wheel 35 provided with a handle 36 is secured to the worm shaft 34. The gears $a$, $b$, $c$ and $d$ are similar in construction so that a detailed description of one will suffice for all. The gear $a$ for example as shown in Figs. 1 and 3 comprises a hollow member or casing 37 on which is formed an annular series of gear teeth, and a cover plate 38. Within this casing is a pair of intermeshing gears 39 and 40 adapted to be driven by hydraulic pressure. The gear 39 is keyed to the shaft 6, and the gear 40 is journaled on the shaft 41, eccentric of the shaft 6. The gear casing has an inner portion 42 concentric with the shaft 41, and in position to coöperate with the teeth on the gear wheel 40, so that a liquid in the gear $a$ cannot escape past the gear 40 at this point. The gear $a$ is provided with an extension 43 which likewise coöperates with the gear 39. The part 43 is formed with a passage 44 extending through the gear $a$ and forming a valve chamber for a valve 45. The latter comprises sections 46, 47 and 48, secured to or formed integral with the valve stem.

Ports 49 establish communication between the valve chamber 44 and the interior of the gear $a$. Check valves 50 and 51 (see Figs. 3 and 4) are placed within the gear $a$ and open inwardly. These valves permit liquid to freely enter the gear $a$, and thereby maintain it filled with liquid, but do not permit the escape of liquid from the gear. The valve 45 is operated by means of a lever 52 pivoted at 53 to the gear $a$ and connected at 54 to a sleeve 55 slidable on the hub of the gear $a$. A lever 56 is pivoted at 57 and is provided at its lower end with studs engaging an annular recess 58 formed in the sleeve 55. The gears $b$, $c$ and $d$ are provided with valves $45^b$, $45^c$ and $45^d$, respectively, corresponding to the valve 45. These valves are operated by levers $56^b$, $56^c$ and $56^d$ connected at their upper ends to a horizontal rod 60. A rod 61 is connected at one end to the upper end of the lever 56 and its opposite end to a crank arm 62 secured to the shaft 31.

The operation will be understood from the following description. When the engine E is running the motion will be transmitted through the reversing clutch R and rotate the shaft 3. When the parts are in the position shown, the sleeve 16 on the shaft 3 will rotate the clutch members 19 and 9 which are in frictional engagement and transmit motion through the gear 11 to the shaft 6. The clutch members 12 and 20 are at this time dis-engaged, so that the gear 12 is not driven directly by the shaft 3. The gear 12 is connected through the clutch member 24 and the sleeve 22, to the hollow shaft 21 so as to rotate therewith. The shaft 6 rotates the gears 39 and 40 and thereby forces a liquid from one side to the other of these gears in a well-known manner. As the valve 45 is at this time in position to open the ports 49, the liquid driven by the gears 39 and 40 circulates freely within the gear $a$. There is likewise a free circulation of liquid in the gears $b$, $c$ and $d$. If now the operator rotates the hand wheel 35 so as to cause a counterclockwise rotation of the worm gear 33, the following operations will take place: The right hand end of the rod 29 will be moved upward, but as it is nearing dead center it will cause but little movement of the levers 25 and 26, so that the clutch connections are unaffected at this time. The rod 61 however will be moved longitudinally to the right, imparting a parallel movement to the levers 56, $56^b$, $56^c$, and $56^d$ about their pivots, and thereby effect a movement of the valves 45, $45^b$, $45^c$, and $45^d$ to the left. The initial movement of the valve 45 gradually brings the section 47 over the ports 49 and thereby cuts off the further circulation of liquid in the gear $a$. As the gears 39 and 40 are thus prevented from rotating within the gear $a$, the latter will be caused to rotate with the gear 39 and shaft 6. This motion is transmitted through the gear wheel $a'$, the hollow shaft 21, the sleeve 22, clutch members 24 and 12, sprocket chain 13, wheel 14 and shaft 15. A continued movement of the valve 45 to the left gradually moves the section 47 past the ports 49, thereby again opening the latter and allowing the gears 39 and 40 to rotate within the gear $a$. At the same time the valve $45^b$ is moved into position to close the ports $49^b$ in the gear wheel $b$ causing the latter to be positively driven by the shaft 6. This motion is transmitted through the gear wheel $b'$ and from thence to the driven member 15. Owing to the relative sizes of these gears, the speed of the driven member is increased. The continued movement of the valves to the left next closes the ports $49^c$ in the gear $c$ and opens the ports $49^b$ so that the gear $c$ now acts as a driving member and further increases the speed. The final movement of the valves to the left opens the port $49^c$ and closes the port $49^d$ in the gear $d$, which therefore operates to drive the hollow shaft 21, and connected parts at the highest speed. By this time the end of the rod 29 has been moved upward beyond the dead center and into such position that a continued rotation of the worm wheel will move the levers 25 and 26 to the left. The crank arm 62 is also by this time in substantially the position in which the crank arm 30 is shown, so that this continued rotation of the worm gear will not substantially affect the valves. As the levers 26 and 27 are moved to the left, the sleeve 22 gradually disconnects the clutch members 12 and 24. Movement of the sleeve 16 at the same time gradually connects the clutch members 20 and 12, and disconnects the clutch members 19 and 9. In this position of parts the shaft 3 is directly connected to drive the sprocket wheel 12, the latter being now free to rotate independently of the hollow shaft 21. In other words the engine E is now connected to drive the shaft 15 independently of the gears within the casing 5. The gear 9 is also at this time disconnected from the shaft 3, so that no motion is imparted to the shaft 6. In other words, the mechanism within the casing 5 is entirely disconnected from the engine E. During these changes in the power transmitting mechanism the worm wheel 33 has been rotated through substantially 180°. By rotating this wheel in the reverse direction toward initial position, the gear connections will be changed in the reverse order. That is the direct connection between the engine E and the driven member will be broken, and the engine connected through the gears $d$ and $d'$ to drive at the highest speed, and the speed then gradually reduced and the transmitting mechanism finally disconnected so that the shaft 15 will come to rest.

When the mechanism is driving through the gears $d$ and $d'$, the speed of the hollow shaft 21 is preferably substantially the same as that of the shaft 3, so that when the clutch mechanism is operated to effect a direct driving engagement between the engine and the shaft 15, there will be little variation in the speed. The reversing mechanism R comprises a clutch and a planetary gearing, here shown as a standard type of planetary gear-clutch reversing mechanism, but any other approved form of reversing mechanism may be substituted therefor. This mechanism comprises a casing 70 loosely mounted on the adjacent ends of the shafts 2 and 3. An annular flange 71 formed on this casing provides inner and outer friction surfaces with which the members 72 and 73 respectively coöperate. The inner clutch member 72 is an expansion ring operated by means of a sleeve 74 splined on the shaft 3. The sleeve 74 is operated by means of the lever 4, which is provided with lugs engaging an annular recess in the sleeve 74. The outer friction brake member 73 is connected at 75 to the standard 7, and is in the form of a split ring provided at its ends with lugs having screwthreaded openings to receive a rod 76 having right and left hand screwthreads. Secured to the rod 76 is an arm 77 formed with a slot 78 engaged by a pin 79 on the lever 4. With the parts in the position shown, the member 72 is in frictional contact with the flange 71 and the brake ring 73 is out of driving engagement with said flange. When the operating lever 4 is moved about its pivot the sleeve 74 is moved to the left, thereby retracting the expansion ring 72 and freeing it from the flange 71. At the same time the arm 77 is rotated and clamps the brake ring 73 to the flange 71. Within the casing 70 is a member 80 keyed to the shaft 3. A gear wheel 81 is keyed to the shaft 2 and meshes with a gear member 82, journaled in the member 80. The member 82 comprises two sections of different diameters, the smaller section formed with gear teeth meshing with the gear teeth of a gear 83 keyed to the hub of the gear casing 70. In operation, with the parts in the position shown, the shaft 2 rotates the gear wheel 81, which in turn rotates the member 82. The latter meshing with the gear 83 keyed to the casing 70, causes the member 80 to rotate about its axis rotating with it the shaft 3. The member 82 has therefore a planetary motion rotating about its own axis and also revolving about the shaft 2. The casing 70 at this time being connected through the clutch member 72 to the sleeve 74 and the shaft 3, rotates with the said shaft. If the clutch lever 4 is operated to disconnect the clutch member 72 and connect the brake member 73, the operation will be as follows: The casing 70 will be held stationary by the brake member 73, and therefore the gear wheel 83 will be held stationary. The gear 81 which rotates with the shaft 2 will rotate the member 82 about its own axis, and as said member is in mesh with the stationary gear 83, the member 82 will be compelled to revolve about the shaft 2 as an axis, carrying with it the member 80, and therefore rotating the shaft 3 in the opposite direction from the shaft 2.

The particular construction and arrangement of the mechanism as herein shown may be varied in many ways without departing from the spirit and scope of the invention, and I wish therefore not to be limited to the particular construction shown.

The invention is well adapted for use with automobiles, and with various tools, such as large planers, lathes, boring mills, etc.; it may also be used with many kinds of elevators, and for various other purposes.

What I claim is new and desire to secure by Letters Patent of the United States is:—

1. In power transmitting mechanism, the combination with a driving member and a driven member, of a series of gears, means to contain a fluid in which said gears are immersed; and means controlling the circulation of the fluid for successively locking the gears to one of said members.

2. In power transmitting mechanism, the combination of a rotary member, a plurality of gears mounted thereon, valve mechanisms associated with said gears, a liquid in which said valve mechanisms and portions of the gears carrying said valve mechanisms are immersed, said liquid being capable of entering the gears, means controlled by the valve mechanisms whereby the gears are successively locked to said rotary member, and means for operating the valve mechanisms.

3. In power transmitting mechanism, the combination of a shaft, a plurality of gears mounted thereon, fluid controlled devices within said gears for locking them to the shaft, means for effecting the successive operation of said devices, a receptacle containing said gears, fluid within the receptacle, and means to place said fluid in communication with said fluid controlled devices.

4. The combination with a rotary element, of a series of rotary members mounted thereon, a fluid clutch in each member comprising a controlling valve, and means for successively bringing the valves to operative position by a simultaneous movement of the valves.

5. The combination of a series of gears, a fluid clutch associated with each gear and comprising fluid operated mechanism within the gear, valves controlling the operation of said clutches, a casing to contain liquid, common to and inclosing said valves and in which liquid the said valves are immersed, means to restrain said liquid from leaving the gears, and mechanism for operating the valves.

6. In power transmitting mechanism, the combination of a rotary element, rotary members thereon, a clutch for each of said members comprising a device carried by the members to control the clutch, and means to effect the successive operation of the clutches by a simultaneous operation of said devices.

7. In power transmitting mechanism, the combination of a rotary element, gears carried thereby, a clutch associated with each gear and operative to connect it with the said rotary element, devices rotatable with said element and controlling the operation of the clutches, and means coöperating with the clutches to singly and successively connect the gears to the rotary element by a simultaneous operation of said devices.

8. In power transmitting mechanism, the combination of a rotatable shaft, gears mounted thereon, a clutch for each gear, a clutch operating device carried by each gear and operable to effect a gradual connection and disconnection of the gear to and from the shaft, and means to effect a movement of the clutch operating devices successively to operative position by a simultaneous operation of said clutch operating devices.

9. The combination of a rotary member, a plurality of gears mounted thereon, a fluid clutch associated with each gear, an operating device for each clutch, and means for continuously and simultaneously operating said devices and thereby successively connecting each gear to the rotary member and disconnecting each gear as the succeeding gear is connected.

10. In power transmitting mechanism, the combination with a shaft, of a plurality of hollow rotary members mounted thereon, clutch mechanism located within said members and adapted to be operated by restricting the circulation of liquid within said members, said mechanism comprising valves, by-passes in said members, said valves controlling said by-passes, means to simultaneously operate said valves and by such operation to cause said valves to close and open said by-passes successively, and thereby successively connect said members to the shaft, means to contain a liquid in which the said hollow rotary members are immersed, and check valves in the hollow members opening inwardly to prevent exit of the liquid from the interior of the hollow members.

11. In power transmission mechanism, the combination with a prime mover, of a driving shaft connected thereto, a second shaft parallel with the driving shaft, a hollow shaft mounted on said driving shaft, a series of stepped gears secured to said hollow shaft, a series of gears mounted on said second shaft, and meshing with said first-named gears, clutch devices associated with said gears and operable to connect said second shaft and said hollow shaft through the pairs of intermeshing gears successively, a driven member, driving connections comprising a clutch between said driven member and said hollow shaft, driving connections comprising a clutch between the driving shaft and said second shaft, and means for operating said clutch devices and clutches successively to operate the driven member through said pairs of intermeshing gears successively, and then to disconnect the hollow shaft and said second shaft from the driving shaft, and connect the latter to the driven member independently of said gears.

12. In power transmission mechanism, the combination with a casing, of a shaft within the casing, hollow power transmitting members mounted on said shaft, and liquid within the casing, inwardly opening check valves in said hollow members, means within said members for causing a local circulation of liquid when said members and shaft have a relative rotation, means for checking the circulation of liquid within said members, and power transmitting gearing coöperating with said members.

13. The combination of a rotatable shaft, gears mounted thereon, clutches connected with the gears, clutch operating devices carried by the said gears, connections between the levers and said operating devices, and means to operate the levers as a unitary device and thereby effect the successive operation of the clutches.

14. The combination of a shaft, gears mounted thereon, a fluid clutch in each gear, each clutch comprising a valve carried by the gears and controlling the operation of the clutch, parallel levers, an operating connection between each lever and a valve, and means for operating the said levers as a unit, said valve being arranged and constructed to effect the successive operation of the clutches when the levers are operated.

In testimony whereof, I have signed my name to this specification in the presence of two subscribing witnesses.

AUGUST SUNDH.

Witnesses:
L. H. CAMPBELL,
JAMES G. BETHELL.